United States Patent
Yen et al.

(10) Patent No.: US 11,064,307 B2
(45) Date of Patent: Jul. 13, 2021

(54) ELECTRONIC DEVICE AND METHOD OF OUTPUTTING AUDIO

(71) Applicant: Beijing Xiaomi Mobile Software Co., Ltd., Beijing (CN)

(72) Inventors: Chiafu Yen, Beijing (CN); Hui Du, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 0 days.

(21) Appl. No.: 16/686,816

(22) Filed: Nov. 18, 2019

(65) Prior Publication Data
US 2020/0162834 A1    May 21, 2020

(30) Foreign Application Priority Data
Nov. 19, 2018    (CN) .......................... 201811378789.9

(51) Int. Cl.
*H04S 7/00*    (2006.01)
*G01S 15/08*    (2006.01)
(Continued)

(52) U.S. Cl.
CPC .............. *H04S 7/303* (2013.01); *G01S 15/08* (2013.01); *H04R 1/025* (2013.01); *H04R 1/028* (2013.01); *H04R 3/12* (2013.01); *H04R 5/02* (2013.01); *H04R 5/04* (2013.01); *H04R 17/00* (2013.01); *H04S 3/008* (2013.01); *H04R 2499/11* (2013.01); *H04S 2400/01* (2013.01); *H04S 2400/11* (2013.01)

(58) Field of Classification Search
CPC ...... H04S 7/303; H04S 3/008; H04S 2400/01; H04S 2400/11; G01S 15/08; H04R 1/025; H04R 1/028; H04R 3/12; H04R 5/02; H04R 5/04; H04R 17/00; H04R 2499/11
USPC ...................... 381/303, 74, 77, 79, 387, 310
See application file for complete search history.

(56) References Cited

U.S. PATENT DOCUMENTS 9,843,881 B1    12/2017    Oates, III et al.
10,467,438 B1*    11/2019    Renner ................ G01N 27/223
(Continued)

FOREIGN PATENT DOCUMENTS

CN    202663535 U    1/2013
CN    102917299 A    2/2013
(Continued)

OTHER PUBLICATIONS

Extended European Search Report dated Feb. 12, 2020, in Patent Application No. 19209675.8, 7 pages.
(Continued)

*Primary Examiner* — Vivian C Chin
*Assistant Examiner* — Con P Tran
(74) *Attorney, Agent, or Firm* — Oblon, McClelland, Maier & Neustadt, L.L.P.

(57) ABSTRACT

The disclosure relates to an electronic device and a method of outputting audio. The electronic device includes a device body; at least two sound generators disposed in the device body; and a controller disposed in the device body. The controller is connected with the at least two sound generators to control each of the sound generators to output audio signals. The audio signals output by the at least two sound generators are superimposed to form a virtual sound source at a preset position.

14 Claims, 6 Drawing Sheets

(51) Int. Cl.
*H04R 1/02* (2006.01)
*H04R 3/12* (2006.01)
*H04R 5/02* (2006.01)
*H04R 5/04* (2006.01)
*H04R 17/00* (2006.01)
*H04S 3/00* (2006.01)

(56) References Cited

U.S. PATENT DOCUMENTS

| | | | |
|---|---|---|---|
| 10,542,366 B1 | 1/2020 | Oates, III et al. | |
| 2010/0119092 A1* | 5/2010 | Kim | H04S 3/008 381/306 |
| 2013/0156233 A1 | 6/2013 | Joo | |
| 2014/0241552 A1* | 8/2014 | Takeda | H04R 1/323 381/307 |
| 2016/0321882 A1* | 11/2016 | Mankowski | G06F 3/017 |
| 2017/0012591 A1 | 1/2017 | Rider et al. | |
| 2018/0046431 A1 | 2/2018 | Shivappa et al. | |
| 2019/0042182 A1 | 2/2019 | Shivappa et al. | |

FOREIGN PATENT DOCUMENTS

| | | |
|---|---|---|
| CN | 103344959 A | 10/2013 |
| CN | 106954143 A | 7/2017 |
| CN | 108810261 A | 11/2018 |
| KR | 10-2012-0055179 A | 5/2012 |

OTHER PUBLICATIONS

Combined Chinese Office Action and Search Report dated Sep. 23, 2020 in Patent Application No. 201811378789.9 (with English translation and English translation of Category of Cited Documents), 22 pages.

Second Office Action issued in corresponding Chinese Application No. 201811378789.9 dated Mar. 11, 2021 (with Machine Translation) (10 pages).

* cited by examiner

ELECTRONIC DEVICE AND METHOD OF OUTPUTTING AUDIO

CROSS-REFERENCE TO RELATED APPLICATIONS

This application is based on and claims priority to Chinese Patent Application No. 201811378789.9, filed on Nov. 19, 2018, the entire contents of which are incorporated herein by reference.

TECHNICAL FIELD

The present disclosure relates to the field of electronic device technology, and more particularly to an electronic device and a method of outputting audio.

BACKGROUND

A sound generating unit is used for outputting audio and is one of the important parts of an electronic device. In an electronic device, the sound generating unit is a sound source for outputting audio, and the closer a user is to the sound generating unit, the louder the volume is. Further, since the sound generating unit has directivity when outputting audio, the sound generating unit needs to be disposed at a designated position in a device body, in order to meet a usage scenario requirement, such as ensuring privacy during a call.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide an electronic device including a device body; at least two sound generators disposed in the device body; and a controller disposed in the device body and connected with the at least two sound generators to control each of the sound generators to output audio signals, wherein the audio signals output by the at least two sound generators are superimposed to form a virtual sound source at a preset position.

According to an aspect, the device body is provided with a display screen, and the at least two sound generators are attached to a back surface of the display screen.

In an example, the at least two sound generators are staggered.

According to an aspect, the electronic device further includes a centreline extending in a length direction or a width direction of the device body, wherein the at least two sound generators are disposed on both sides of the centreline.

In an example, the at least two sound generators are symmetrically disposed about the centreline.

According to an aspect, the electronic device further includes a receiver connected with the controller, wherein the at least two sound generators are configured to output an ultrasonic wave, and the receiver is configured to receive an ultrasonic wave reflected back by an external object, and wherein the controller is configured to determine a distance between the external object and the electronic device based on the ultrasonic wave reflected back by the external object and received by the receiver.

In an example, the device body includes an upper portion and a lower portion disposed along a length direction, and the upper portion and the lower portion are both provided with the sound generators.

According to an aspect, the electronic device further includes a first antenna module disposed at the upper portion; and a second antenna module disposed at the lower portion, wherein the first antenna module and the second antenna module are both connected with the controller, and wherein the controller is further configured to switch between the first antenna module and the second antenna module based on the ultrasonic wave reflected back by the external object and received by the receiver.

In an example, the sound generators include moving iron units or piezoelectric units.

Aspects of the disclosure also provide a method of outputting audio, the method being applied to an electronic device that includes a device body, at least two sound generators disposed in the device body, and a controller disposed in the device body and connected with the at least two sound generators to control each of the sound generators to output audio signals, wherein the audio signals output by the at least two sound generators are superimposed to form a virtual sound source at a preset position. The method includes obtaining position information of a preset position and audio information to be output; and, based on the position information of the preset position and the audio information to be output, controlling the at least two sound generators to output audio signals respectively to form the virtual sound source at the preset position.

According to an aspect, when obtaining the position information of the preset position, the method further includes obtaining the position information of the preset position corresponding to a current audio playing mode.

According to another aspect, when obtaining the position information of the preset position, the method further includes receiving control instructions and obtaining the position information of the preset position based on the control instructions.

In an example, the device body is provided with a display screen, and the at least two sound generators are attached to a back surface of the display screen.

According to an aspect, the electronic device further includes a receiver connected with the controller, and the method further includes outputting, via the at least two sound generators, an ultrasonic wave; receiving, via the receiver, an ultrasonic wave reflected back by an external object; and determining, via the controller, a distance between the external object and the electronic device based on the ultrasonic wave reflected back by the external object and received by the receiver.

According to another aspect, the electronic device further includes a first antenna module disposed at the upper portion and a second antenna module disposed at the lower portion, the first antenna module and the second antenna module are both connected with the controller, and the method further includes switching, via the controller, between the first antenna module and the second antenna module based on the ultrasonic wave reflected back by the external object and received by the receiver.

It is to be understood that both the foregoing general description and the following detailed description are illustrative and explanatory only and are not restrictive of the present disclosure.

BRIEF DESCRIPTION OF DRAWINGS

The accompanying drawings, which are incorporated in and constitute a part of this specification, illustrate aspects

Figure 1:
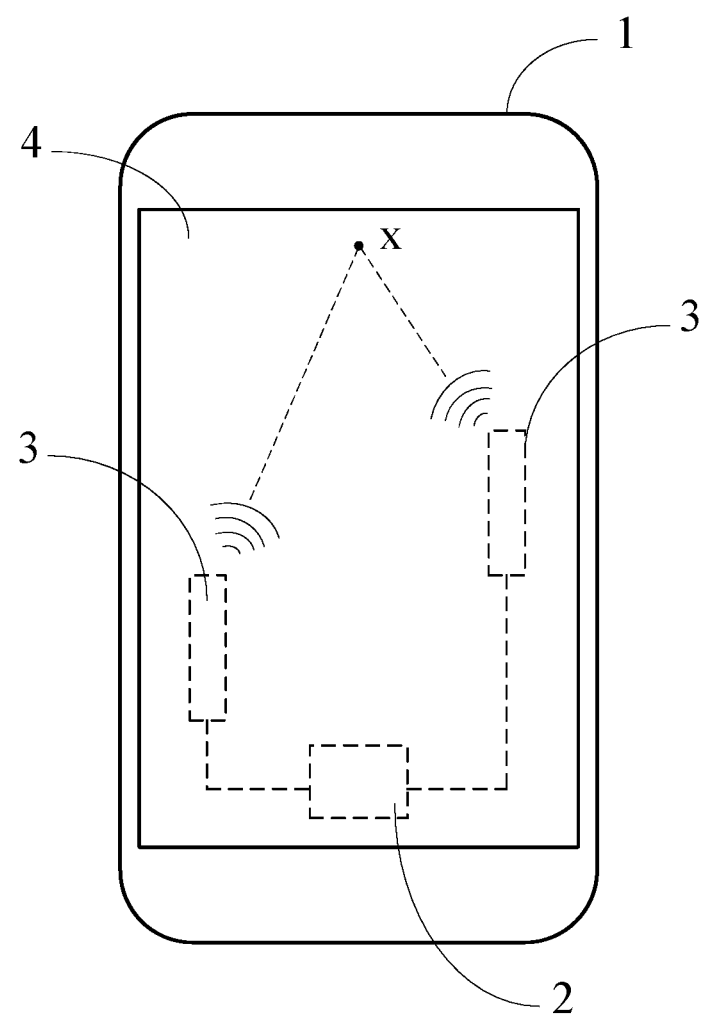
FIG. 1 is a schematic diagram illustrating a structure of an electronic device according to an exemplary aspect of the present disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of illustrative aspects do not represent all implementations consistent with the disclosure. Instead, they are merely examples of apparatuses and methods consistent with aspects related to the disclosure as recited in the appended claims.

In the electronic device provided by related art, the sound generating unit needs to be disposed at the designated position in the device body, therefore, requirement on the installation condition of the sound generating unit is higher, and an internal space planning of the electronic device is limited to a great extent, so the design and assembly of the electronic device are relatively difficult.

According to a first aspect of an example of the present disclosure, there is provided an electronic device. The electronic device may be a mobile phone, a tablet computer, and a wearable device and so on. It should be noted that illustrative descriptions are made only with a mobile phone as an example in the drawings of the present disclosure.

Figure 2:
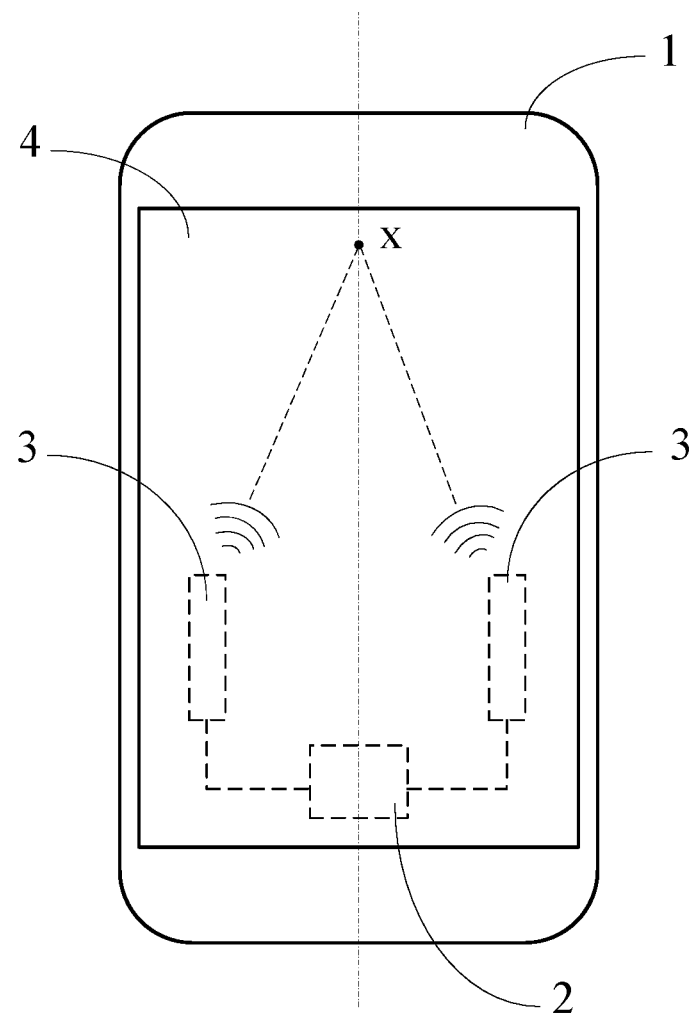
FIG. 2 is a schematic diagram illustrating a structure of an electronic device according to an exemplary aspect of the present disclosure.
Figure 3:
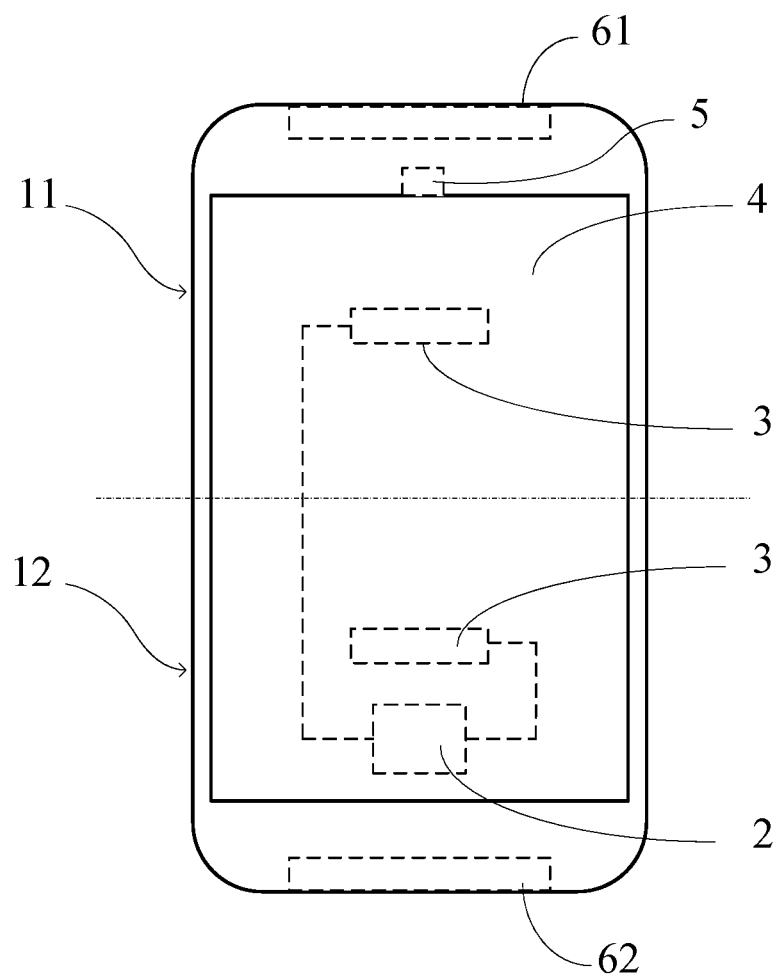
FIG. 3 is a schematic diagram illustrating a structure of an electronic device according to an exemplary aspect of the present disclosure.
Figure 4:
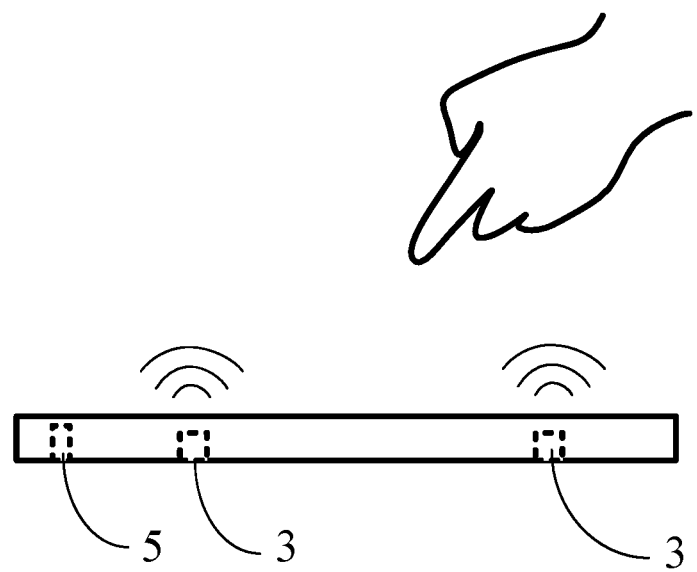
FIG. 4 is a schematic diagram illustrating a usage state of an electronic device according to an exemplary aspect of the present disclosure.
Figure 5:
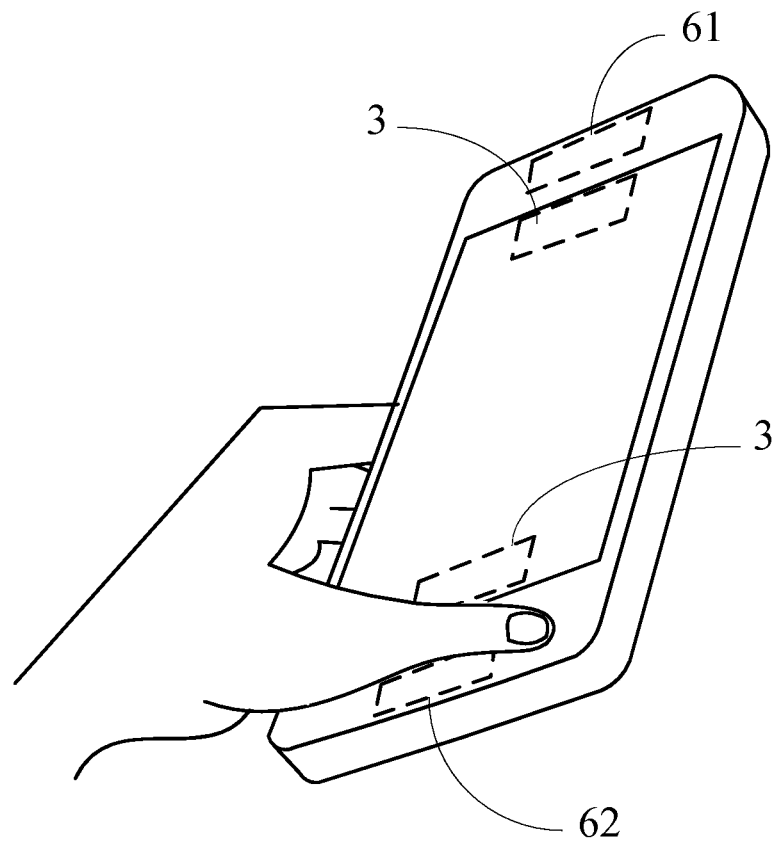
FIG. 5 is a schematic diagram illustrating a usage state of an electronic device according to an exemplary aspect of the present disclosure.

FIGS. 1-3 are schematic diagrams illustrating a structure of an electronic device according to different examples of the present disclosure. FIGS. 4 and 5 are schematic diagrams illustrating usage states of an electronic device according to an example of the present disclosure. As shown in FIGS. 1-3, the electronic device provided by the examples of the present disclosure includes a controller 2 and at least two sound generating units (i.e., sound generators) 3 which are all disposed in a device body 1. The controller 2 is connected with the at least two sound generating units 3 for controlling each sound generating unit 3 to output audio signals. Further, the audio signals output by the at least two sound generating units 3 are superimposed, to form a virtual sound source X at a preset position.

According to audio information to be output and preset position information, the controller 2 may control different sound generating units 3 to output audio signals respectively, so as to ensure that the audio signals respectively output by different sound generating units 3 are superimposed, to form the virtual sound source X at the preset position. The superimposed audio signals present a characteristic of strong directivity at the virtual sound source X, so that a user feels like that the audio signals were output from the virtual sound source X. It should be understood that the virtual sound source X may be formed at any position by the audio signals output by different sound generating units 3. On the contrary, if a position of the virtual sound source X is fixed, the setting positions of the sound generating units 3 may also have many options, and may not be limited to the designated positions.

The position of the virtual sound source X is not limited herein, and may be preset according to a usage scenario requirement. For example, the virtual sound source X is formed in an upper portion of the device body 1 to realize an equivalent effect of outputting audio through a receiver.

In an example of the present disclosure, by forming the virtual sound source X at the preset position by the audio signals output by the at least two sound generating units 3, a desired effect of sound source may be realized even though the sound generating units 3 are not disposed at the designated positions. Therefore, the sound generating units 3 may be disposed at any suitable positions in the device body 1, and the requirements on the setting positions of the sound generating units 3 are effectively reduced. Further, the internal space planning of the electronic device may have more possibilities, which is conducive to reducing the design and assembly difficulties of the electronic device.

In some examples, the device body 1 includes a display screen 4, and a middle frame surrounding an edge of the display screen 4. Optionally, the sound generating units 3 are provided at the middle frame. Alternatively, the at least two sound generating units 3 are provided, for example, attached to a back surface of the display screen 4. In the case that the sound generating units 3 are attached to the display screen 4, the sound generating units 3 may drive the display screen 4 to synchronously vibrate to output an audio signal when outputting audio signals. Therefore, it is not required to open a sound hole on the display screen 4, which is conducive to realizing a large screen ratio.

In some examples, the sound generating unit 3 may be selected from a moving iron unit or a piezoelectric ceramic unit, etc., and it is not limited herein.

Regarding the distribution of the at least two sound generating units 3, in an example, as shown in FIG. 1, the at least two sound generating units 3 are staggered in a plane parallel to the display screen 4. It can be effectively ensured that when the staggered sound generating units 3 output audio signals, the superposition of the output audio by the sound generating units 3 at different positions can realize the desired effect. In particular, since the plurality of sound generating units 3 are not stacked, it is possible to effectively prevent adjacent sound generating units 3 from being unable to output desired audio signals due to interference.

In some examples, as shown in FIG. 2 or 3, the electronic device includes a centreline extending along a length direction or a width direction of the device body 1. Optionally, the at least two sound generating units 3 are distributed on both sides of the centreline. An interaction area of audio signals output by the sound generating units 3 distributed on both sides of the centreline may cover a larger area of the device body 1, so that the virtual sound source X may be formed at any position of the device body 1. And optionally, the at least two sound generating units 3 are symmetrically distributed about the centreline, so that the audio signals output by the at least two sound generating units 3 form the virtual sound source X at the preset position more accurately.

In some examples, as shown in FIGS. 3 and 4, the electronic device further includes a receiving unit (i.e., receiver) 5. The receiving unit 5 is connected with the controller 2. Further, the at least two sound generating units 3 are configured to output an ultrasonic wave. The receiving unit 5 is configured to receive an ultrasonic wave reflected back by an external object. The controller 2 is further configured to determine a distance between the external object and the electronic device according to the ultrasonic wave reflected back by the external object and received by the receiving unit 5.

For example, the controller 2 determines the distance between the external object and the electronic device according to a transmission time when the ultrasonic wave is output by the sound generating unit 3 and a reception time when the ultrasonic wave reflected back by the external object is received by the receiving unit 5. Due to a strong directivity of the ultrasonic wave, distance monitoring may be performed for a larger range through the at least two sound generating units 3, thereby realizing better monitoring effect.

The receiving unit 5 may be a microphone module on the electronic device. Further, the number and the setting positions of the receiving units 5 are not specifically limited herein.

In some examples, as shown in FIG. 3, the device body 1 may include an upper portion 11 and a lower portion 12 distributed along the length direction. The sound generating units 3 are provided at both the upper portion 11 and the lower portion 12. The electronic device further includes a first antenna module 61 disposed at the upper portion 11 and a second antenna module 62 disposed at the lower portion 12. The first antenna module 11 and the second antenna module 12 are both connected with the controller 2. Where, the controller 2 may also be configured to switch between the first antenna module 61 and the second antenna module 62 according to the ultrasonic wave reflected back by the external object and received by the receiving unit 5.

For example, there is usually a case that only the upper portion or the lower portion is blocked by an external object during use of the electronic device, which may affect the antenna module in the blocked part to transmit or receive signals. In some examples, as shown in FIGS. 4 and 5, when using the electronic device to make a call, the user usually holds the lower portion 12 of the electronic device first, and then places the electronic device near an ear for calling. It should be understood that during this process, the second antenna module 62 in the lower portion 12 is in a blocked external environment, while the first antenna module 61 in the upper portion 11 is in a relatively open external environment.

In this example, the sound generating units 3 in the upper portion 11 and the lower portion 12 output ultrasonic waves at the same time, so when the lower portion 12 is blocked first, the ultrasonic wave output by the sound generating unit 3 in the lower portion 12 is reflected first and to be received by the receiving unit 5. At this time, the processor 2 may enable the first antenna module 61 in the relatively open external environment according to the ultrasonic wave reflected back and received by the receiving unit 5, so as to ensure that the electronic device may smoothly transmit and receive signals.

Alternatively, the controller 2 may further determine whether to use the first antenna module 61 or the second antenna module 62 according to the distance between the external object and the electronic device.

Figure 6:
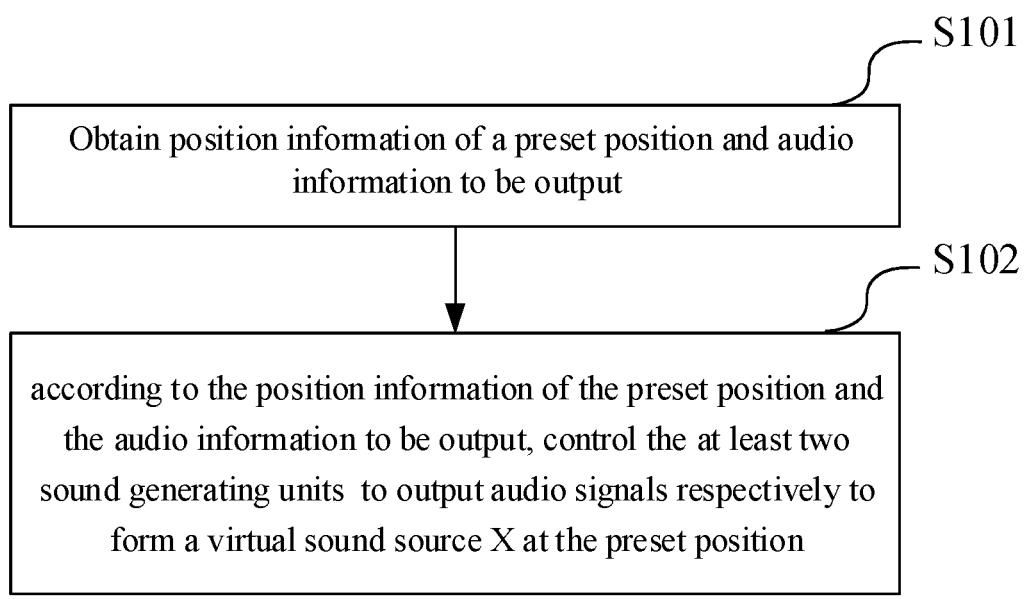
FIG. 6 is a flowchart illustrating a method of outputting audio according to an exemplary aspect of the present disclosure.

According to a second aspect of the present disclosure, there is provided a method of outputting audio applied to the electronic device provided above. FIG. 6 is a flowchart illustrating a method of outputting audio according to an example of the present disclosure. As shown in FIG. 6, the method includes the following steps.

At step S101, position information of a preset position and audio information to be output are obtained. The preset position refers to a position where a virtual sound source X is desired to be formed. The audio information to be output may be call voice information, video, or audio or the like, which is not limited herein.

In an example, obtaining the position information of the preset position includes: obtaining the position information of a corresponding preset position according to a current audio playing mode.

Optionally, the controller 2 stores a correspondence between the audio playing modes and preset positions. For example, the controller 2 stores position information of a preset position corresponding to a receiver mode and position information of a preset position corresponding to a speaker mode. Thus, when the audio playing mode has been determined, the controller 2 may obtain the position information of the preset position corresponding to the audio playing mode. The method has the characteristics of simple operation and high intelligence.

In an example, obtaining the position information of the preset position includes: receiving control instructions, and obtaining the position information of the preset position according to the control instructions.

The control instructions may be received in many manners, for example, the control instructions may be received by detecting that a virtual button is triggered.

Optionally, virtual buttons in one-to-one correspondence with different areas of the device body 1 are displayed on a display screen 4. For example, the display screen 4 displays a virtual model proportional to the device body 1, and the virtual buttons are formed in different areas of the virtual model. Correspondence between identifiers of the virtual buttons and the position information of different areas of the device body 1 is stored in the controller 2. When in use, the area of the device body 1 corresponding to the virtual button being triggered is taken as the preset position.

Specifically, when detecting that a virtual button is triggered, control instructions are received. The control instructions carry an identifier of the triggered virtual button. Further, the position information of the corresponding area is obtained according to the identifier of the virtual button, thus, the position information of the preset position is obtained.

In this way, the selection process is visualized, which is conducive to the user for performing personalized selection and realizing a particular audio output position.

Of course, the control instructions may also be received through voice recognition, and keyboard input, etc., and the control instructions may directly carry the position information of the preset position, which will not be described one by one in the examples of the present disclosure.

At step S102, according to the position information of the preset position and the audio information to be output, the at least two sound generating units 3 are controlled to output audio signals respectively to form a virtual sound source X at the preset position.

The controller 2 may control each of the sound generating units 3 to output the audio signals respectively according to a spatial distribution of the at least two sound generating units 3 relative to the preset position and the audio information to be output. The audio signals output by the sound generating units 3 are obtained by processing the audio information with the controller 2. In this way, the audio signals obtained by superimposing audio signals output by the at least two sound generating units 3 has the largest sound intensity and the strongest directivity at the preset position, that is, the virtual sound source X.

Figure 7:
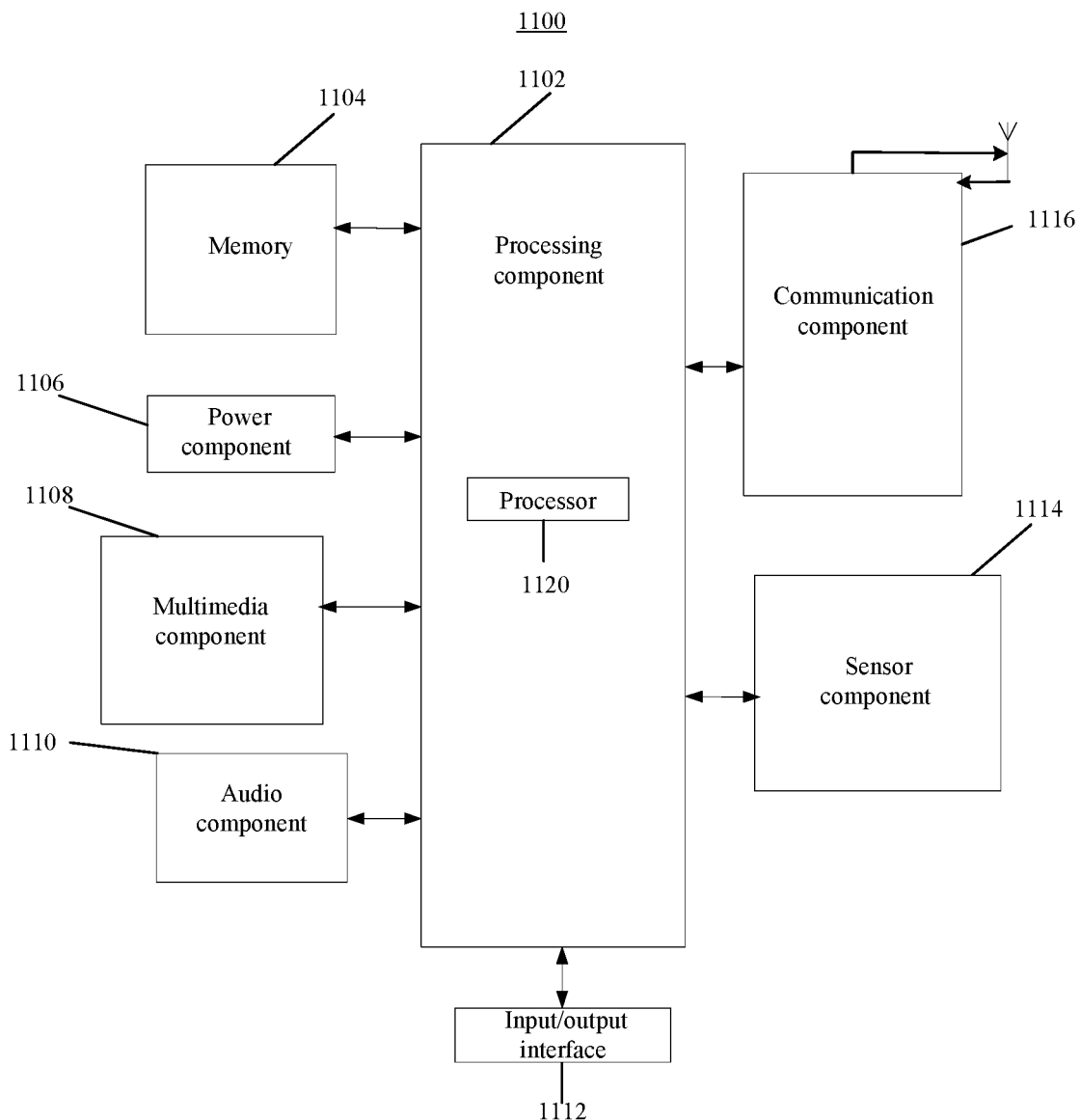
FIG. 7 is a structural diagram illustrating an electronic device according to an exemplary aspect of the present disclosure.

FIG. 7 is a block diagram illustrating an electronic device 1100 according to an exemplary aspect of the present disclosure. For example, the electronic device 1100 may be a mobile phone, a terminal (e.g., access terminal), a computer, a digital broadcast terminal, a messaging device, a game console, a tablet, a medical device, exercise equipment, a personal digital assistant, and the like.

Referring to FIG. 7, the electronic device 1100 may include one or more of the following components: a processing component 1102, a memory 1104, a power component 1106, a multimedia component 1108, an audio component 1110, an input/output (I/O) interface 1112, a sensor component 1114 and a communication component 1116.

The processing component 1102 typically controls overall operations of the electronic device 1100, such as the operations associated with display, telephone calls, data communications, camera operation, audio, sound and recording operations. The processing component 1102 may include one or more processors 1120 to execute instructions to perform all or part of the steps of the methods described above. Moreover, the processing component 1102 may include one or more modules which facilitate the interaction between the processing component 1102 and other components. For instance, the processing component 1102 may include a multimedia module to facilitate the interaction between the multimedia component 1108 and the processing component 1102.

The memory 1104 is configured to store various types of data to support the operation of the electronic device 1100. Examples of such data include instructions for any applications or methods operated on the electronic device 1100, contact data, phonebook data, messages, pictures, video, audio, etc. The memory 1104 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1106 provides power to various components of the electronic device 1100. The power component 1106 may include a power management system, one or more power sources, and any other components associated with the generation, management, and distribution of power in the electronic device 1100.

The multimedia component 1108 includes a screen that provides providing an output interface between the electronic device 1100 and the user. In some aspects, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some aspects, the multimedia component 1108 includes a front camera and/or a rear camera. The front camera and the rear camera may receive an external multimedia datum while the electronic device 1100 is in an operation mode, such as a photographing mode or a video mode. Each of the front camera and the rear camera may be a fixed optical lens system or have focus and optical zoom capability. The screen includes a display area and a light supplement area, the display area is provided with a display module, an under-screen camera is provided below the display module, and the under-screen camera shoots through the display module; the light supplement area is disposed side by side or partially overlapped with the display area.

A light supplement lamp is disposed below the screen, and the light emitted from the light supplement lamp is transmitted through the light supplement area to supplement the under-screen camera.

The audio component 1110 is configured to output and/or input audio signals. For example, the audio component 1110 includes a microphone ("MIC") configured to receive an external audio signal when the electronic device 1100 is in an operation mode, such as a call mode, a recording mode, and a voice recognition mode. The received audio signal may be further stored in the memory 1104 or transmitted via the communication component 1116. In some aspects, the audio component 1110 further includes a speaker to output audio signals.

The I/O interface 1112 provides an interface between the processing component 1102 and peripheral interface modules, such as a keyboard, a click wheel, buttons, and the like. The buttons may include, but are not limited to, a home button, a volume button, a starting button, and a locking button.

The sensor assembly 1114 includes one or more sensors to provide status assessments of various aspects of the electronic device 1100. For instance, the sensor component 1114 may detect an open/closed status of the electronic device 1100, relative positioning of components, e.g., the display and the keypad, of the electronic device 1100, a change in position of the electronic device 1100 or a component of the electronic device 1100, a presence or absence of user contact with the electronic device 1100, an orientation or an acceleration/deceleration of the electronic device 1100, and a change in temperature of the electronic device 1100. The sensor component 1114 may include a proximity sensor configured to detect the presence of nearby objects without any physical contact. The sensor component 1114 may also include a light sensor, such as a CMOS or CCD image sensor, for use in imaging applications. In some aspects, the sensor component 1114 may also include an accelerometer sensor, a gyroscope sensor, a magnetic sensor, a pressure sensor, a temperature sensor, or an ambient light brightness sensor. The ambient light brightness sensor is used for detecting the ambient light intensity, and when the ambient light brightness sensor detects that the intensity of the ambient light is lower than a preset value, the light supplement lamp is controlled to start to supplement the under-screen camera.

The communication component 1116 is configured to facilitate communication, wired or wirelessly, between the electronic device 1100 and other devices. The electronic device 1100 can access a wireless network based on a communication standard, such as WiFi, 2G, 3G, LTE, 5G, or a combination thereof. In one exemplary aspect, the communication component 1116 receives a broadcast signal or broadcast associated information from an external broadcast management system via a broadcast channel. In one exemplary aspect, the communication component 1116 further includes a near field communication (NFC) module to facilitate short-range communications.

In an exemplary aspect, the electronic device 1100 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described light supplement control methods.

In an exemplary aspect, there is also provided a non-transitory computer-readable storage medium including instructions, such as included in the memory 1104, executable by the processor 1120 in the electronic device 1100, for performing the above-described methods. For example, the non-transitory computer-readable storage medium may be a ROM, a RAM, a CD-ROM, a magnetic tape, a floppy disc, an optical data storage device, and any other suitable medium for data storage.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the disclosure will be apparent to those skilled in the art from consideration of the specification and practice of the disclosure disclosed here. This application is intended to cover any variations, uses, or adaptations of the disclosure following the general principles thereof and including common knowledge or customary technical means in the art not disclosed in the present disclosure. It is intended that the specification and examples be considered as illustrative only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. An electronic device, comprising:
    a device body;
    at least two sound generators disposed in the device body;
    a controller disposed in the device body and connected with the at least two sound generators to control each of the sound generators to output audio signals, wherein the audio signals output by the at least two sound generators are superimposed to form a virtual sound source at a preset position; and
    a receiver connected with the controller;
    wherein the at least two sound generators are configured to output ultrasonic waves, and the receiver is configured to receive a reflected ultrasonic wave reflected back by an external object, and
    wherein the controller is configured to determine a distance between the external object and the electronic device based on the reflected ultrasonic wave reflected back by the external object and received by the receiver;
    wherein the device body includes an upper portion and a lower portion disposed along a length direction, and the upper portion and the lower portion are both provided with the sound generators;
    the electronic device further comprising:
    a first antenna module disposed at the upper portion; and
    a second antenna module disposed at the lower portion,
    wherein the first antenna module and the second antenna module are both connected with the controller, and
    wherein the controller is further configured to switch between the first antenna module and the second antenna module based on the reflected ultrasonic wave reflected back by the external object and received by the receiver, and enable the first antenna module or the second antenna module in a relatively open external environment.

2. The electronic device according to claim 1, wherein the device body is provided with a display screen, and the at least two sound generators are attached to a back surface of the display screen.

3. The electronic device according to claim 2, wherein the at least two sound generators are staggered.

4. The electronic device according to claim 3, further comprising a centreline extending in a length direction or a width direction of the device body, wherein the at least two sound generators are disposed on both sides of the centreline.

5. The electronic device according to claim 4, wherein the at least two sound generators are symmetrically disposed about the centreline.

6. The electronic device according to claim 1, wherein the sound generators include moving iron units or piezoelectric units.

7. A method of outputting audio, the method being applied to an electronic device that includes a device body, at least two sound generators disposed in the device body, and a controller disposed in the device body and connected with the at least two sound generators to control each of the sound generators to output audio signals, wherein the audio signals output by the at least two sound generators are superimposed to form a virtual sound source at a preset position, the method comprising:
    obtaining position information of the preset position and audio information to be output; and
    based on the position information of the preset position and the audio information to be output, controlling the at least two sound generators to output audio signals respectively to form the virtual sound source at the preset position;
    the electronic device further includes a receiver connected with the controller, and
    the method further comprises:
    outputting, via the at least two sound generators, an ultrasonic waves;
    receiving, via the receiver, a reflected ultrasonic wave reflected back by an external object; and
    determining, via the controller, a distance between the external object and the electronic device based on the reflected ultrasonic wave reflected back by the external object and received by the receiver;
    wherein the device body includes an upper portion and a lower portion disposed along a length direction, and the upper portion and the lower portion are both provided with the sound generators;

the electronic device further includes a first antenna module disposed at the upper portion and a second antenna module disposed at the lower portion, the first antenna module and the second antenna module are both connected with the controller, and wherein the method further comprises:

switching, via the controller, between the first antenna module and the second antenna module based on the reflected ultrasonic wave reflected back by the external object and received by the receiver, and enabling the first antenna module or the second antenna module in a relatively open external environment.

8. The method according to claim 7, wherein obtaining the position information of the preset position includes obtaining the position information of the preset position corresponding to a current audio playing mode.

9. The method according to claim 7, wherein obtaining the position information of the preset position includes receiving control instructions and obtaining the position information of the preset position based on the control instructions.

10. The method according to claim 7, wherein the device body is provided with a display screen, and the at least two sound generators are attached to a back surface of the display screen.

11. The method according to claim 10, wherein the at least two sound generators are staggered.

12. The method according to claim 11, wherein the electronic device includes a centreline extending in a length direction or a width direction of the device body, wherein the at least two sound generators are disposed on both sides of the centreline.

13. The method according to claim 12, wherein the at least two sound generators are symmetrically disposed about the centreline.

14. The method according to claim 7, wherein the sound generators include moving iron units or piezoelectric units.

* * * * *